US009071053B2

(12) United States Patent
Leung (10) Patent No.: US 9,071,053 B2
(45) Date of Patent: Jun. 30, 2015

(54) ELECTRICAL SAFETY SYSTEM WITH TIMER

(71) Applicant: Polygroup Macau Limited (BVI), Road Town, Tortola (VG)

(72) Inventor: Chi Yin Alan Leung, Chai Wan (HK)

(73) Assignee: POLYGROUP MACAU LIMITED (BVI), Tortola (VG)

( * ) Notice: Subject to any disclaimer, the term of this patent is extended or adjusted under 35 U.S.C. 154(b) by 0 days.

(21) Appl. No.: 14/187,061

(22) Filed: Feb. 21, 2014

(65) Prior Publication Data

US 2014/0285927 A1 Sep. 25, 2014

Related U.S. Application Data

(60) Provisional application No. 61/803,209, filed on Mar. 19, 2013.

(51) Int. Cl.
*H02H 3/16* (2006.01)
*H01H 83/14* (2006.01)

(52) U.S. Cl.
CPC ............ *H02H 3/162* (2013.01); *H01H 83/144* (2013.01); *H02H 3/16* (2013.01)

(58) Field of Classification Search
CPC ........ H02H 3/16; H02H 3/162; H01H 83/144

USPC .......................................................... 361/42
See application file for complete search history.

(56) References Cited

U.S. PATENT DOCUMENTS

| | | | |
|---|---|---|---|
| 5,365,617 A * | 11/1994 | Tarr | 4/508 |
| 6,798,631 B1 * | 9/2004 | Farsetta | 361/115 |
| 7,154,718 B1 * | 12/2006 | Finlay et al. | 361/42 |
| 7,633,726 B2 * | 12/2009 | Huang et al. | 361/42 |
| 8,102,246 B2 * | 1/2012 | Davidson, II | 340/309.16 |
| 8,242,631 B2 * | 8/2012 | King | 307/64 |

* cited by examiner

*Primary Examiner* — Zeev V Kitov
(74) *Attorney, Agent, or Firm* — Troutman Sanders LLP; Ryan A. Schneider; Benjamin C. Wiles (57) ABSTRACT

An electrical safety system with an integrated timer is disclosed. The electrical safety system may have an input line connected to an output via one or more communication paths. The electrical safety system may also have a ground fault circuit interrupter module including a sensor coil for monitoring current passing from the input line to the electrical load and producing a current signal and a ground fault circuit interrupter circuit. Further, the electrical safety system may have one or more switches for opening or closing the one or more communication paths between the input line and the output, and a solenoid for operating the one or more switches. Additionally, the electrical safety system may have a timer module comprising a timer circuit configured to generate a timer signal and a selector switch in electrical communication with the timer circuit and a visual display.

19 Claims, 7 Drawing Sheets

*FIG. 3* GFCI WITH TIMER (SINGLE AC/DC CONVERTOR)

ELECTRICAL SAFETY SYSTEM WITH TIMER

BACKGROUND

1. Field of the Invention

Embodiments of the present invention relate to electrical safety systems and timing systems, and more particularly, to ground fault circuit interrupter systems with integrated timers.

2. Description of Related Art

A variety of electrical safety systems are known. One type of known system, for example, is a residual-current device, such as a ground fault circuit interrupter ("GFCI") system. GFCI systems help protect people, and electronics, from electric shock or delivery of excess electrical current. More specifically, GFCI systems shut off an electric circuit when they detect that current is flowing along an unintended path, such as through a person, and into the ground. Moreover, GFCI systems can react quickly when they detect unintended current flow, thereby minimizing the harm done.

A GFCI system can be embodied in a plug, outlet, circuit, or other device. In many places, for example, the use of GFCI systems in certain electrical outlets, such as bathroom outlets, is required by building codes. Additionally, GFCI systems can be built into electrical plugs, such as plugs on a hair dryer, to help prevent electrocution.

A variety of timers are also known. As those of skill in the art will understand, timers can be electrical devices that take some action at a certain time. For example, a timer can be a switch that trips after a predetermined amount of time has passed or at a certain time during the day.

In use, timers can be connected to various devices, such as Christmas tree lights and pool pumps, for example. In this manner, the timers can automatically switch the Christmas tree lights or pool pumps on or off at certain, predetermined times.

A problem with traditional timers, and with traditional GFCI systems, however, is that they are each manufactured and sold separately. Accordingly, consumers must separately purchase a GFCI system (or a device incorporating a GFCI system) and a timer to obtain the benefits of both. The GFCI system and the timer can then be piggybacked together to provide the safety benefits of the GFCI system and the control capabilities of the timer. This need to purchase multiple devices, however, increases cost. In addition, piggybacking the devices also causes the final system to be overly complex. The increased number of devices also increases the risk of electrical malfunction and/or electrical shock during use.

What is needed, therefore, is an electrical safety system, such as a GFCI system, with an integrated timer. The integrated system should reduce complexity and cost, and increase safety. It is to these needs that embodiments of the present invention are primarily directed.

SUMMARY

Briefly described, embodiments of the present invention relate to an electrical safety system with an integrated timer. In some embodiments, the electrical safety system can be a ground fault circuit interrupter ("GFCI") system. The timer can be set to provide a signal to the GFCI system at a specified time or times. The signal can prevent electricity from flowing through the GFCI system toward a load, or, in some embodiments, can alternatively enable electricity to flow through the GFCI system toward the load. In this manner, the timer can be integrated into the GFCI system, eliminating the need to buy two separate devices and improving performance of the GFCI/timer system. This invention can therefore reduce the cost to the consumer and the complexity of GFCI/timer systems. The invention can also increase consumer safety.

In some embodiments, an electrical safety system can have an input line and an output in electrical communication with the input line via one or more communication paths and comprising an electrical load. The system can also have a ground fault circuit interrupter module including a sensor coil for monitoring current passing from the input line to the electrical load and producing a current signal, and a ground fault circuit interrupter circuit in electrical communication with the sensor coil. Additionally, in some embodiments, the ground fault circuit interrupter module can include one or more switches configured to selectively open or close the one or more communication paths between the input line and the electrical load and a solenoid for operating the one or more switches in response to a control signal generated by the ground fault circuit interrupter. In some embodiments, the system may also include a timer module that can have a timer circuit configured to generate a timer signal, a selector switch in electrical communication with the timer circuit, and a visual display in electrical communication with the timer circuit and configured to display an indication related to the timer signal generated by the timer circuit. A system according to the present disclosure can have a housing configured to contain the ground fault circuit interrupter module and the timer module.

In some embodiments, the electrical safety system can have an alternating current to direct current converter in electrical communication with the input line, the ground fault circuit interrupter module and the timer module. In some other embodiments, the electrical safety system can have a first alternating current to direct current converter in electrical communication with the input line and the ground fault circuit interrupter module, and a second alternating current to direct current converter in electrical communication with the input line and the timer module.

An electrical safety system according to the present disclosure can have a housing that includes an electrical plug for connecting to an electrical outlet. A housing for some embodiments can include an electrical outlet in electrical communication with the output. In some embodiments, the housing is integrated into an electrical outlet, and in other embodiments the housing is integrated into a pump for a swimming pool. In some embodiments, the housing is integrated into a string of Christmas lights.

In some embodiments, the one or more switches open in response to the sensor sensing an undesirable change in current. Some embodiments according to the present disclosure can have the visual display indicate an amount of time remaining before the one or more switches are opened, or a time of day when the one or more switches will be opened.

A method according to the present disclosure can include the steps of providing an input line, connecting the input line to a ground fault circuit interrupter module, and connecting the input line to an electrical output. Some methods according to the present disclosure can include the steps of disconnecting the input line from the electrical output when the current sensor senses an undesired change in current and providing a timer module in communication with the ground fault circuit interrupter module. Some methods according to the present disclosure include connecting the input line to the electrical output when a timer signal of the timer module indicates that the device should be energized, and disconnecting the input line from the electrical output when the timer signal of the timer module indicates that the device should not be energized.

Some methods according to the present disclosure include providing an alternating current to direct current converter connected to the input line and in electrical communication with the ground fault circuit interrupter module and the timer module. Some other methods according to the present disclosure include both providing a first alternating current to direct current converter connected to the input line and in electrical communication with the ground fault circuit interrupter module, and providing a second alternating current to direct current converter connected to the input line and in electrical communication with the timer module. In some embodiments of a method according to the present disclosure, the timer signal indicates that the device should not be energized a specific time after the timer module has been set, and in others the timer signal indicates that the device should not be energized at a specific time of day.

In some embodiments, an electrical safety system according to the present disclosure can include an input line, an output in electrical communication with the input line via one or more communication paths, and one or more switches configured to selectively open or close the one or more communication paths between the input line and the electrical load. In some embodiments, the system can have a ground fault circuit interrupter module including a sensor coil for monitoring current passing from the input line to the electrical load and producing a current signal and a ground fault circuit interrupter circuit in electrical communication with the sensor coil, wherein the ground fault circuit interrupter circuit is configured to open and close the one or more switches. In some embodiments, the system may have a timer module including a timer circuit configured to generate a timer signal, wherein the timer signal is configured to open and close the one or more switches, a selector switch in electrical communication with the timer circuit, and a visual display in electrical communication with the timer circuit and configured to display an indication related to the timer signal generated by the timer circuit.

In some embodiments, the timer signal opens or closes the one or more switches by signaling the ground fault circuit interrupter circuit to open or close the one or more switches. According to some embodiments in accordance with the present disclosure, the timer signal opens or closes the one or more switches by activating a solenoid. In some embodiments, the timer signal opens or closes the one or more switches at a predetermined time of day.

These and other aspects of the present invention are described in the Detailed Description below and the accompanying figures. Other aspects and features of embodiments of the present invention will become apparent to those of ordinary skill in the art upon reviewing the following description of embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

Various features and advantages of the present invention may be more readily understood with reference to the following detailed description taken in conjunction with the accompanying drawing figures, wherein like reference numerals designate like structural elements, and in which.

DETAILED DESCRIPTION

To facilitate an understanding of the principles and features of the various embodiments of the invention, various illustrative embodiments are explained below. Although exemplary embodiments of the invention are explained in detail as being an electrical safety system (such as a ground fault circuit interrupter ("GFCI") system) with an integrated timer, it is to be understood that other embodiments are contemplated, such as embodiments employing other types of electrical safety systems, residual current devices, GFCI systems, and/or timers. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Several features of the present invention are defined to be in electrical communication with other features of the present invention. As used herein, element A is in electrical communication with element B if element A and element B are coupled to each other in such a way that electrical current can pass along a communication path from element A to element B or from element B to element A. Further, electrical communication between two elements may be direct or indirect. As used herein, element A is in direct electrical communication with element B if the communication path between element A and element B has an electrical resistance of substantially zero ohms. As used herein, element A is in indirect electrical communication with element B if the communication path between element A and element B has an electrical resistance with a magnitude greater than substantially zero ohms. Moreover, whenever any two features of the present invention are said to be in electrical communication with each other, the two features may by in electrical communication via an electrical connection element. As used herein and as those skilled in the art would recognize, an electrical connection element can be electrical connection elements known in the art or developed at a later time, including but not limited to, an electrical conductor, a combination of electrical components, e.g. resistors, capacitors, inductors, and the like, an electrical circuit, solder, and the like. Further, an electrical connection element can provide direct or indirect electrical communication between two elements.

To facilitate an understanding of the principles and features of the present invention, various illustrative embodiments are explained below. In particular, various embodiments of the present invention are described as a GFCI system with an integrated timer. Some aspects of the invention, however, may be applicable to other contexts, and embodiments employing these aspects are contemplated. For example and not limitation, some aspects of the invention may be applicable to various types of electrical safety systems, such as various types of electrical safety switches. Accordingly, where the terms "GFCI," "GFCI system," "residual current device," "timer," and related terms are used throughout this disclosure, it will be understood that other devices, entities, objects, or activities can take the place of these in various embodiments of the invention.

As described above, a problem with existing electrical safety systems and timers is that they are manufactured and sold separately. Thus, to produce an electrical safety system and timer combination, a consumer must purchase multiple devices and piggyback the devices together. In addition to being expensive, the use of multiple devices can cause the final electrical system to be overly complex, and can increase the risk of electrical malfunction and/or electrical shock during use.

Figure 1:
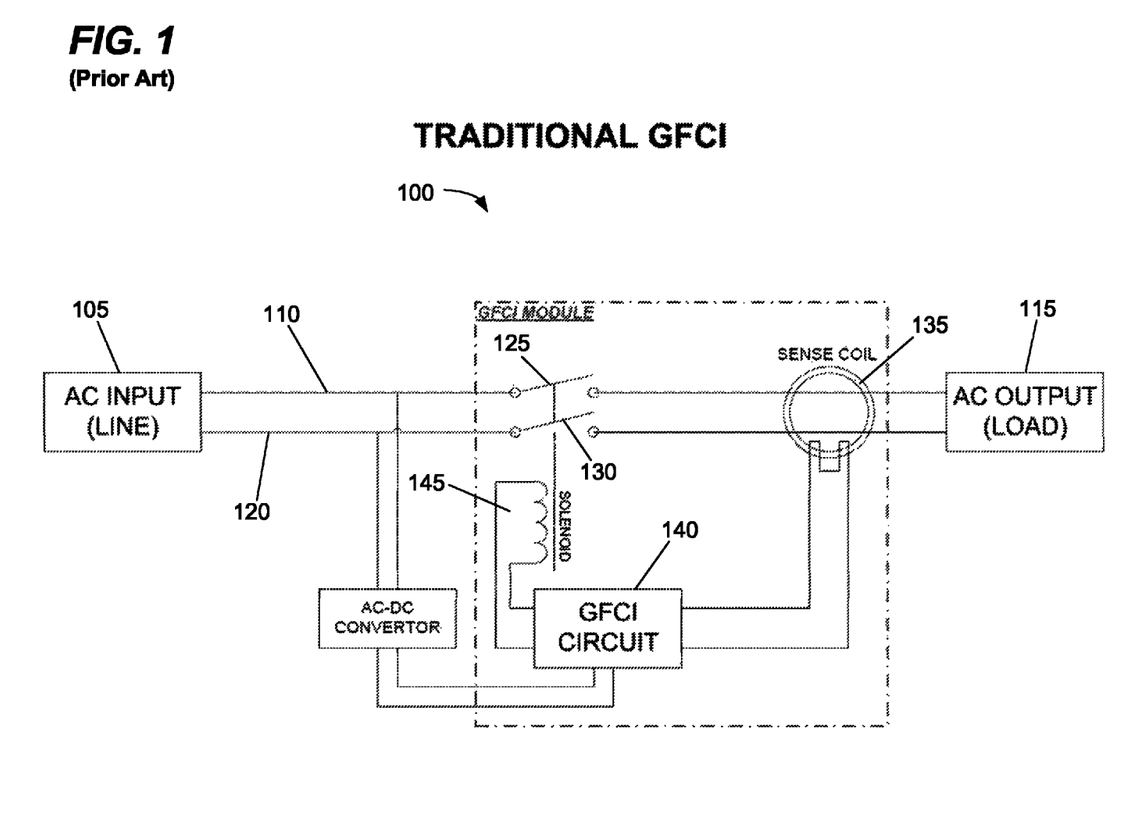
FIG. 1 depicts a traditional GFCI circuit.

FIG. 1 shows a traditional electrical safety system. More particularly, FIG. 1 shows a traditional GFCI system 100. As shown, the input 105 to the system can be an electrical input, such as an AC input line. The AC input line can be in electrical communication with a power plant, generator, battery, or similar electricity-providing device.

The input 105 can be in electrical communication with a "hot" or charged communication path 110. The hot communication path 110 can enable electrical communication between the input 105 and a load 115. Specifically, the hot communication path 110 can enable electricity to flow from the input 105 to the load 115. The load 115 can also be in electrical communication with a neutral communication path 120, which can enable electrical communication between the load 115 and the input 105. Specifically, the neutral communication path 120 can enable electricity to flow from the load 115 back to the input 105, thereby completing an electrical circuit. In some embodiments, the load can be, for example, an electrically powered device.

As shown in FIG. 1, one or more of the communication paths 110, 120 can comprise one or more switches 125, 130. The switches 125, 130 can enable the communication paths 110, 120 to be closed, such that electricity can flow between the input 105 and the load 115, or open, to prevent electricity from flowing between the input 105 and the load 115. In some designs, a first switch 125 can be in electrical communication with the hot communication path 110, and a second switch 130 can be in electrical communication with the neutral communication path 120.

Ideally, in the design shown in FIG. 1, electricity flows from the input 105, through the hot communication path 110, across the load 115, through the neutral communication path 120, and back to the input 105. However, in some cases, undesirable circumstances can arise that disturb this flow. In some instances, for example, electricity can flow from the input 105, through the hot communication path 110, and through an outside object into the ground. This can occur, for example, when a person touches exposed electrical component and is electrically shocked, causing electricity to flow through the person and into the ground. This can also occur when the load, or electrically powered device, is electrically (and undesirably) connected to ground via water or some other electrical connection.

In cases where a person is being shocked, or where the electrical flow is unintentionally and undesirably going to ground, as described above, it is often desirable to stop the flow of electricity through the circuit. Many GFCI systems 100 enable this functionality. More specifically, many GFCI systems 100 sense changes in the electrical current flowing through the communication paths 110, 120 when undesirable circumstances arise. These changes in electrical current often result from the flow of electricity being directed into the ground. More particularly, since some or all of the electricity flows from the input 105 into the ground, it does not flow from the load 115 back to the input 105, or it flows at a reduced current. Thus, there is a difference in the amount of current that flows toward the load 115 and away from the load 115. GFCI systems 100 can sense this difference in current and can stop the flow of electricity toward the load 115. This, in turn, can prevent the circuit from providing an extended electric shock.

To stop the flow, as shown in FIG. 1, a sensor 135, such as a sense coil (or other differential circuit transformer), can be configured to react to a difference in the amount of current flowing through the hot communication path 110 and the neutral communication path 120. In normal operation, the sensor 135 produces no signal, very little signal, or a "no-error" type signal to the GFCI circuit 140. When the flow of electricity across the load 115 is disturbed, however, such as when a person is being shocked, the difference in the amount of current flowing through the hot communication path 110 and the neutral communication path 120 can cause the sensor 135 to deliver an increased signal, or "error" type signal to the GFCI circuit 140. The GFCI circuit 140 can receive this signal, and if the current difference exceeds a predetermined threshold, the GFCI circuit 140 can cause one or more of the switches 125, 130 to open, stopping the flow of electricity toward the load 115 and through the circuit. In some designs, for example, the GFCI circuit 140 can deliver a signal to a solenoid 145, causing the solenoid to open one or more of the switches 125, 130 on the hot communication path 110 or the neutral communication path 120. In this manner, the GFCI system 100 can stop the flow of electricity from the input 105 to the load 115, or to any person or object that is receiving an electrical shock.

In conventional applications, a GFCI system 100, such as the one shown in FIG. 1, can be connected, usually in series, to a timer (not shown). In some applications, for example, the GFCI system 100 can be part of a plug assembly on an electrical device. The plug can be plugged into a timer, which, in turn, can be plugged into a wall outlet. In this manner, the timer can either cut power to or provide power to the GFCI system 100 and the electrical device.

Figure 2:
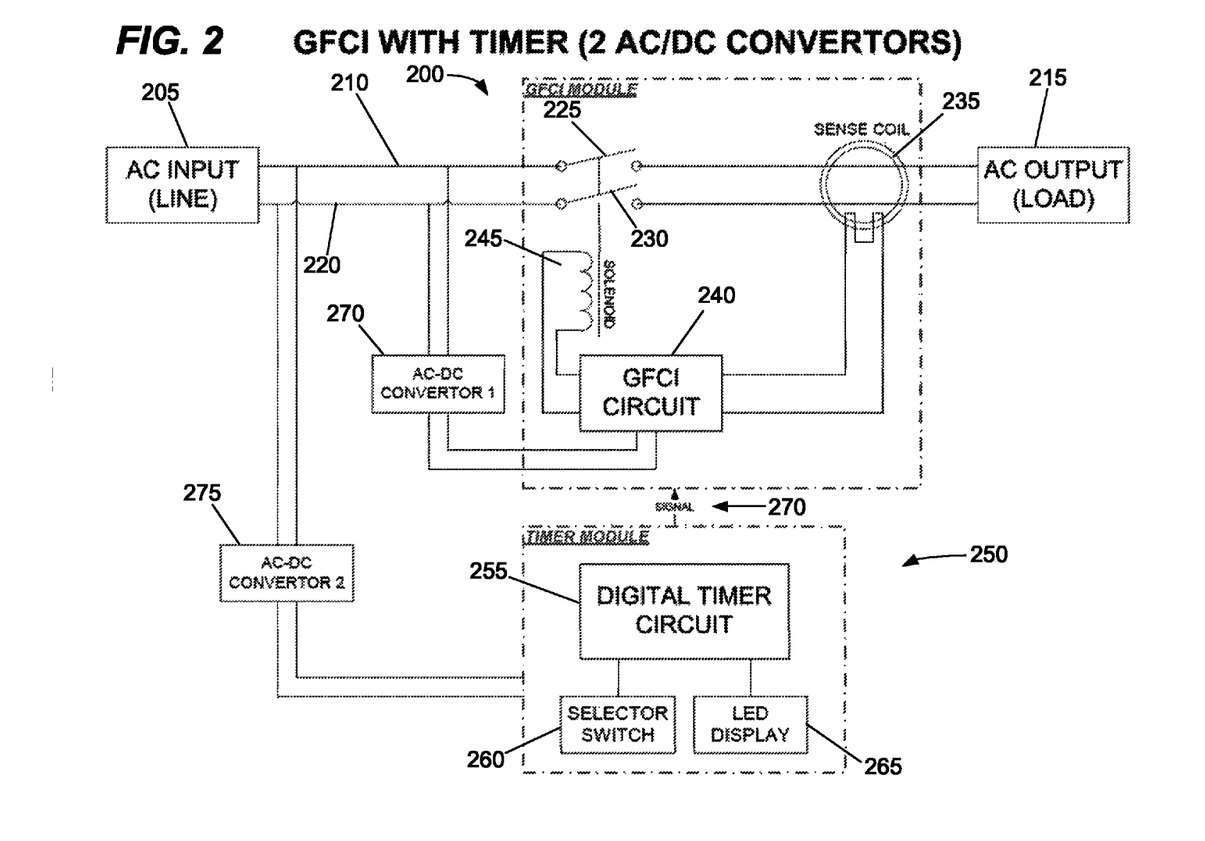
FIG. 2 depicts an electrical safety system with an integrated timer, in accordance with some embodiments of the present invention.

FIG. 2 shows an embodiment of the present invention. As shown, a timer 250 can be integrated into the electrical safety system (e.g., the GFCI system 200). The present invention can therefore provide a less costly, simpler, and less dangerous system than traditional systems.

In some embodiments, the electrical safety system, such as the GFCI system 200, can be similar to the GFCI system 100 described above. More particularly, the GFCI system 200 can comprise an input 205, hot communication path 210, load 215, neutral communication path 220, switches 225, 230, sensor 235, GFCI circuit 240, and solenoid 245. In some embodiments, these elements can be configured similarly to, or the same as, those described above.

As shown in FIG. 2, in some embodiments, the timer 250 can comprise a timer circuit 255, a selector switch 260, and a display 265, among other components. In some embodiments, the timer 250 can provide one or more signals 270, such as an "open" signal, a "close" signal, or both, to the electrical safety system, such as the GFCI system 200 shown in FIG. 2. In some embodiments, the "open" signal or "close" signal can be sent via one or more communication paths, such as a wire, to the electrical safety system. In other embodiments, one or more of the signals 270 can be sent wirelessly to, and received by, the electrical safety system. The timer 250 can therefore comprise a wireless transmitter or transceiver to send these signals 270, and the electrical safety system can comprise a wireless receiver or transceiver to receive this signals 270. In some embodiments, the signals 270 can be sent by the timer circuit 255 and received by the GFCI circuit 240.

In some embodiments, an "open" signal can cause the GFCI system 200 to prevent electricity from flowing from the input 205 toward the load 215. More specifically, the "open" signal can cause the GFCI system 200 to open one or more of the switches 225, 230 on the hot communication path 210 and/or the neutral communication path 220, thereby opening the circuit and preventing the flow of electricity through the circuit. Similarly, in some embodiments, the "close" signal can cause the GFCI system 200 to begin providing electricity toward the load 215. In particular, the "close" signal can cause the GFCI system 200 to close one or more of the switches 225, 230 on the hot communication path 210 and/or the neutral communication path 220. In this manner, the timer 250 can control whether the input 205 can provide power through the hot and/or neutral communications paths 210, 220 toward and through the load 215.

In some embodiments, the timer 250 can provide one or more signals 270, such as "open" or "close" signals, to a solenoid or other known device (now shown), to cause an additional switch or switches (not shown) on the hot communication path, neutral communication path, or both to open or close. In this manner, the timer 250 can control when the input provides electricity to the load 215 independent of the electrical safety system.

In some embodiments, the selector switch 260 can provide a user with one or more options for setting the timer 250. In some embodiments, for example, the selector switch 260 can enable the user to set the timer 250 so that the timer 250 delivers an "open" signal, "close" signal, or both at a specified time or times. Moreover, while the term "selector switch" 260 is used in its singular form in this description, the selector switch can comprise one or multiple switches, buttons, touch-screen displays, and the like that are capable of allowing a user to set a timer 250.

In some embodiments, the specified time or times can be defined in one or more ways. The specified time, for example, can be an amount of time in the future. In other words, a user can use the selector switch 260 to set the timer 250 to deliver an "open" signal or "close" signal to the electrical safety system in an amount of time in the future, such as in 1 minute, 5 minutes, 30 minutes, 45 minutes, 1 hour, or any other amount of time. Accordingly, the timer 250 can be configured to open or close one or more of the switches 225, 230 after a predetermined amount of time had passed, thereby providing power to or preventing the flow of power to an electrical device (i.e., the load 215). In some embodiments, a user can use the selector switch to set the timer 250 to deliver one or more "open" signals or "close" signals at multiple times. Thus, a user can set the timer 250 to provide power to an electrical device at some time in the future and to terminate the supply of power later on.

In some embodiments, the specified time can also be a specific time. Thus, a user can use the selector switch 260 to set the timer 250 to deliver an "open" signal or "close" signal to the electrical safety system at one or more specific times, such as at 9:00 am, 12:00 pm, 3:30 pm, 9:45 pm, 12:01 am, or at any other time. The timer 250 can therefore be configured to open or close one or more of the switches 225, 230 at one or more predetermined times of a day, thereby providing power to or preventing the flow of power to an electrical device (i.e., the load 215). Accordingly, in some embodiments, the timer 250 can comprise a clock, or other known device that tracks the time.

In some embodiments, the specified time can be a running time. More specifically, a user can use the selector switch 260 to set the timer 250 so that power is delivered to an electrical device (i.e., the load 215) for a specified time. In some embodiments, the timer 250 can be programmed to provide power to the electrical device for the same amount of specified time, and during the same time, each day or on user-selected days. In some embodiments, for example, a user can use the selector switch 260 to select the specified time, i.e., the amount of time to provide power to the electrical device, such as 15 minutes or 8 hours. After an amount of time is selected, the timer 250 can send a "close" signal to the electrical safety system, thereby providing power to the electrical device. When the specified time has passed, and the electrical device has therefore received power for the desired amount of time, the timer 250 can send an "open" signal to the electrical safety system, thereby terminating the flow of power to the electrical device. In some embodiments, the timer 250 can send the "close" and "open" signals to the electrical device at the same time of the day every day, or on user-selected days. In this manner, the electrical device (e.g., a pool pump) can be "on" or running at the same time each day. In some embodiments, when power is not provided to the timer/electrical safety system combination (such as, for example and not limitation, when the combination is unplugged from an outlet), the specified time can reset to a factory default, such as 5 minutes or 6 hours.

In some embodiments, as mentioned above, the selector switch 260 can comprise one or more buttons, such as a "set" button. Pressing the button one time can power on the timer and/or add a predetermined amount of time, such as 5 minutes, to the specified time. Pressing the button additional times can add additional time, such as 5 minutes, onto the specified time each time the button is pressed. In some embodiments, holding the button down can add additional time onto the specified time for each increment of time that the button is held. In some embodiments, for example, 5 minutes can be added to the specified time for each second that the button is held down. In this manner, the timer 250 can be set in modes wherein the specified time is an amount of time in the future, in modes wherein the specified time is a specific time during a day, and in modes where the specified time is the running time of the electrical device.

The timer 250 can additionally comprise a visual display 265, such as an LED display. The visual display 265 can indicate the time, provide options to enable a user to set the timer 250, indicate the specified time, and perform a multitude of additional functions. In addition, in some embodiments, the timer circuit 255 can be a digital timer circuit.

Figure 3:
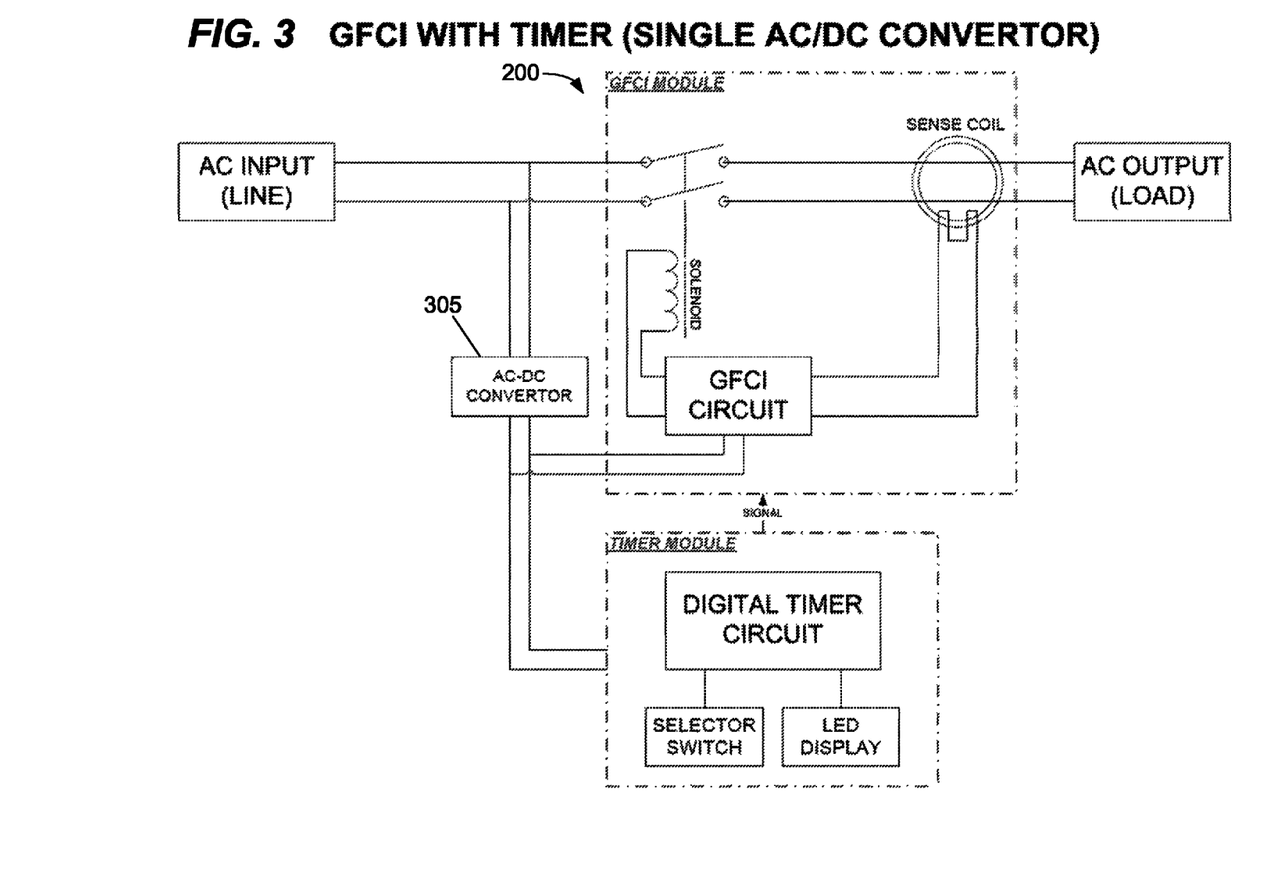
FIG. 3 depicts an electrical safety system with an integrated timer, in accordance with some embodiments of the present invention.

As shown in FIG. 2, in some embodiments, components of the electrical safety system and the timer 250 can be powered by electricity that is directed through one or more AC-DC converters 270, 275. In some embodiments, for example, the GFCI circuit 240 can be powered by electricity that is directed through a first AC-DC converter 270, and the timer can be powered by electricity that is directed through a second AC-DC converter 275. As shown in FIG. 3, however, in some embodiments, the electrical safety circuit and the timer can both be powered by electricity that is directed through a single AC-DC converter 305.

Figure 4:
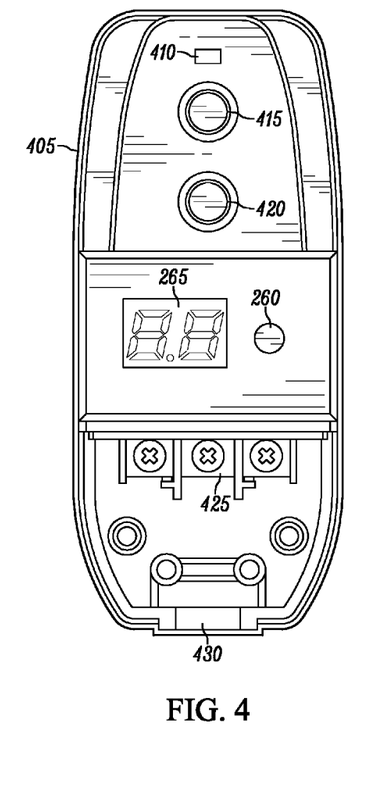
FIG. 4 depicts a housing for an electrical safety system with an integrated timer, in accordance with some embodiments of the present invention.

As shown in FIG. 4, and in some embodiments, the electrical safety system and timer 250 can be assembled inside a housing 405. In some embodiments, housing 405 may have selector switch 260 and visual display 265 attached to an outer portion thereof. Additionally, in some embodiments, there may be an indicator light 410, a reset switch 415, and a test switch 420 located on an outer portion of housing 405. Indicator light 410 may light up when current is able to pass through to load 215, or it may light up when current is unable to pass to load 215. Reset switch 415 may function to close switches 225, 230 after GFCI circuit 240 has triggered solenoid 245 in order to allow the system to be reset and pass current to load 215. Test switch 420 may trigger solenoid 245, opening switches 225, 230 in order to ensure that solenoid 245 is still functional. After pressing test switch 420, a user may press reset switch 415 to prepare GFCI system 200 to pass current to load 215 again.

In some embodiments, housing 405 may enclose load terminals 425. Load terminals 425 may be in electrical communication with the electrical output of GFCI system 200, and may also be in electrical communication with load 215. In some embodiments, wires may pass through housing exit 430 and connect load 215 to terminals 425. In other embodiments, load 215 may be wired directly to GFCI system 200.

Figure 5:
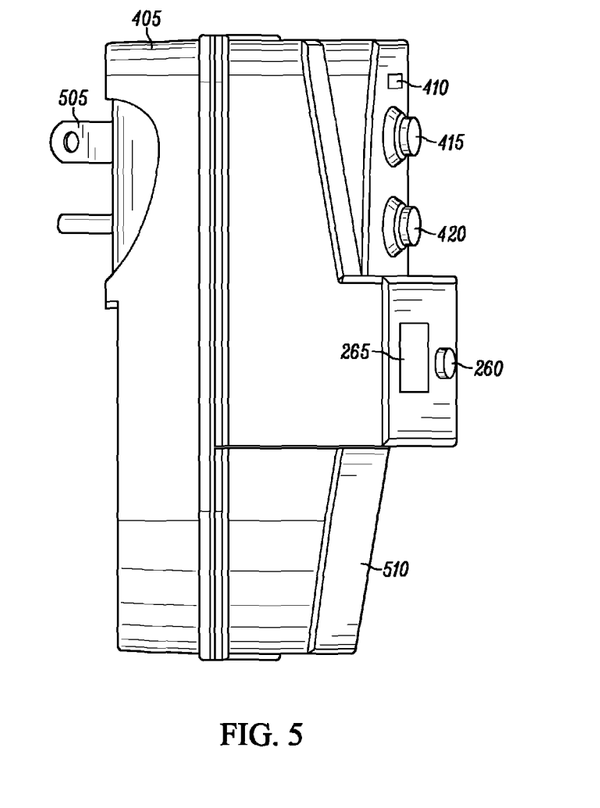
FIG. 5 depicts an alternate view of the housing for an electrical safety system with an integrated timer of FIG. 4, in accordance with some embodiments of the present invention.

As shown in FIG. 5, some embodiments according to the present disclosure have a plug 505 integrated in housing 405 and in electrical communication with input 205 to allow input 205 to be connected to an electrical outlet. In some embodiments, housing 405 may include a cover 510 in order to cover the electrical connections at the terminals 425. Cover 510 may be secured by any number of known methods including screws, hinges, or adhesives.

Figure 6:
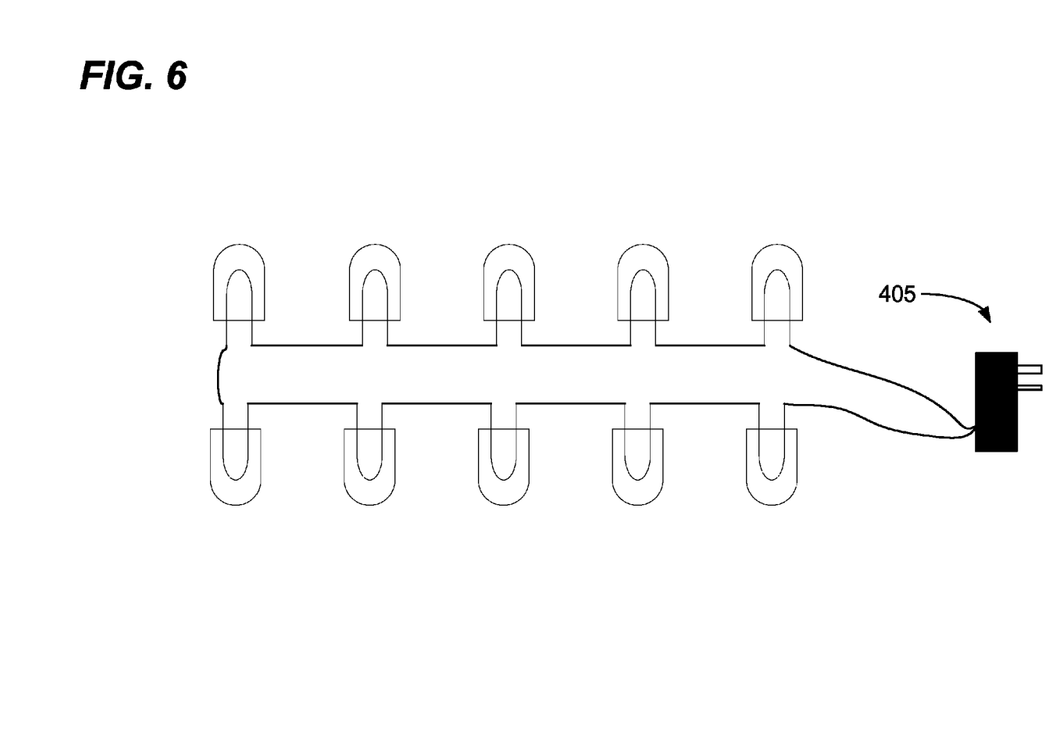
FIG. 6 depicts a string of Christmas lights with an integrated electrical safety system, in accordance with some embodiments of the present invention.
Figure 7:
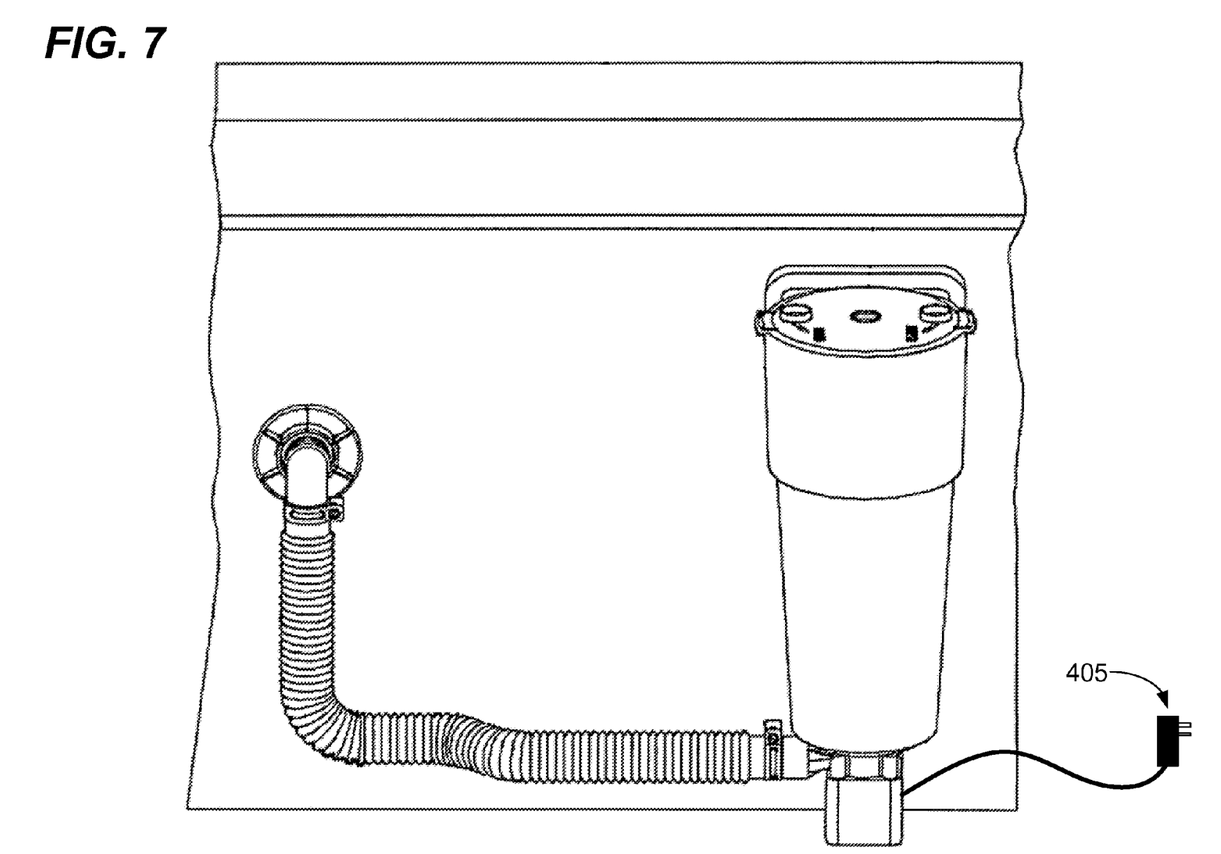
FIG. 7 depicts a swimming pool pump with an integrated electrical safety system, in accordance with some embodiments of the present invention.

In some embodiments, housing 405 may have a length of wire with a plug in electrical communication with input 205 exiting therefrom. In certain applications, having a plug connected to a length of wire, as opposed to integrated into the housing 405 may be useful in situations where the electrical outlet is not conveniently located. Allowing the housing 405 to be located in a more convenient location may aid a user in activating the timer or GCFI functions of the system. In some embodiments, an electrical outlet in electrical communication with the output of GFCI system 200 is disposed on the housing to allow a load 215 to be plugged into housing 405. In certain applications, this arrangement may allow a system according to the present disclosure to be used with accessories such as pumps or Christmas lights that have been purchased separately. Alternatively, as illustrated in FIGS. 6 and 7, housing 405 may be formed integrally with a device such as a string of Christmas lights or a pump for a swimming pool, for example.

As described above, embodiments of the present invention provide several capabilities. In some embodiments, for example, a user can set the timer 250 to turn an electrical device on or off at a specified time. In some embodiments, for example, the present invention can be configured to turn a pool pump on at a first time, and turn the pump off at a second time. In some embodiments, the present invention can be configured to turn Christmas lights on at a first time, and turn the lights off at a second time. Accordingly, there is no need to buy a timer separately from the pool pump or the lights, as the timer is integrated into the electrical safety system of the pool pump or the lights.

While certain systems and methods related to electrical safety systems and timers have been disclosed in some exemplary forms, many modifications, additions, and deletions may be made without departing from the spirit and scope of the system, method, and their equivalents, as set forth in claims to be filed in a later, non-provisional application. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented in this application. It is important, therefore, that the claims be regarded as including such equivalent constructions.

What is claimed is:
1. An electrical safety system comprising:
an input line;

an output in electrical communication with the input line via one or more communication paths and comprising an electrical load;
a ground fault circuit interrupter module comprising:
a sensor coil for monitoring current passing from the input line to the electrical load and producing a current signal;
a ground fault circuit interrupter circuit in electrical communication with the sensor coil;
one or more switches configured to selectively open or close the one or more communication paths between the input line and the electrical load; and
a solenoid for operating the one or more switches in response to a control signal generated by the ground fault circuit interrupter circuit; and
a timer module in electrical communication with the ground fault circuit interrupter module, the timer module comprising:
a timer circuit configured to generate a timer signal;
a selector switch in electrical communication with the timer circuit; and
a visual display in electrical communication with the timer circuit and configured to display an indication related to the timer signal generated by the timer circuit;
wherein, responsive to one or more of the current signal and the timer signal, the ground fault circuit interrupter circuit generates the control signal causing the solenoid to operate the one or more switches; and
a housing configured to contain the ground fault circuit interrupter module and the timer module.

2. The electrical safety system of claim 1, further comprising an alternating current to direct current converter in electrical communication with the input line, the ground fault circuit interrupter module, and the timer module.

3. The electrical safety system of claim 1, further comprising:
a first alternating current to direct current converter in electrical communication with the input line and the ground fault circuit interrupter module; and
a second alternating current to direct current converter in electrical communication with the input line and the timer module.

4. The electrical safety system of claim 1, wherein the housing further comprises an electrical plug for connecting to an electrical outlet.

5. The electrical safety system of claim 4, wherein the housing further comprises an electrical outlet in electrical communication with the output.

6. The electrical safety system of claim 1, wherein the system is integrated into a pump for a swimming pool.

7. The electrical safety system of claim 1, wherein the system is integrated into a string of Christmas lights.

8. The electrical safety system of claim 1, wherein responsive to receipt of a current signal, from the sensor coil, indicating an undesirable change in current, the ground fault circuit interrupter generates a control signal causing the solenoid to open the one or more switches.

9. The electrical safety system of claim 1, wherein the visual display indicates an amount of time remaining before the one or more switches are opened.

10. The electrical safety system of claim 1, wherein the visual display indicates a time of day when the one or more switches will be opened.

11. A method of providing electricity to a device, comprising:
providing an input line;
connecting the input line to a ground fault circuit interrupter module;
connecting the input line to a device;
disconnecting the input line from the device by using a solenoid to open one or more switches when a current sensor senses an undesired change in current;
providing a timer module in communication with the ground fault circuit interrupter module;
responsive to receipt of a close timer signal from the timer module, generating, by the ground fault circuit interrupter module, a control signal for connecting the input line to the device by using the solenoid to close the one or more switches, wherein a close timer signal from the timer module indicates that the device should be energized; and
responsive to receipt of an open timer signal from the timer module, generating, by the ground fault circuit interrupter module, a control signal for disconnecting the input line from the device by using the solenoid to open the one or more switches, wherein the open timer signal from the timer module indicates that the device should not be energized.

12. The method of claim 11, further comprising:
providing an alternating current to direct current converter connected to the input line and in electrical communication with the ground fault circuit interrupter module and the timer module.

13. The method of claim 11, further comprising:
providing a first alternating current to direct current converter connected to the input line and in electrical communication with the ground fault circuit interrupter module; and
providing a second alternating current to direct current converter connected to the input line and in electrical communication with the timer module.

14. The method of claim 11, wherein the open timer signal indicates that the device should not be energized a specific time after the timer module has been set.

15. The method of claim 11, wherein the open timer signal indicates that the device should not be energized at a specific time of day.

16. An electrical safety system comprising:
an input line;
an electrical load in electrical communication with the input line via one or more communication paths;
one or more switches configured to selectively open or close the one or more communication paths between the input line and the electrical load;
a ground fault circuit interrupter module comprising:
a sensor coil for monitoring current passing from the input line to the electrical load and for producing a current signal; and
a ground fault circuit interrupter circuit in electrical communication with the sensor coil, wherein the ground fault circuit interrupter circuit is configured to open and close the one or more switches;
a timer module comprising:
a timer circuit configured to generate a timer signal, the timer signal adapted for transmission to the ground fault circuit interrupter module;
a selector switch in electrical communication with the timer circuit; and
a visual display in electrical communication with the timer circuit and configured to display an indication related to the timer signal generated by the timer circuit; and wherein, responsive to receipt of at least one of the current signal and the timer signal, the ground fault circuit interrupter circuit opens or closes the one or more switches.

17. The electrical safety system of claim 16, wherein the timer signal signals the ground fault circuit interrupter circuit to open or close the one or more switches.

18. The electrical safety system of claim 16, wherein responsive to receipt of the timer signal, the ground fault circuit interrupter circuit opens or closes the one or more switches by activating a solenoid.

19. The electrical safety system of claim 16, wherein the timer signal signals the ground fault circuit interrupter circuit to open or close the one or more switches at a predetermined time of day.

* * * * *